April 23, 1963 C. BROOKS ETAL 3,086,216
REINFORCED PROTECTED DECORATIVE STRIP MATERIALS
Filed July 21, 1959
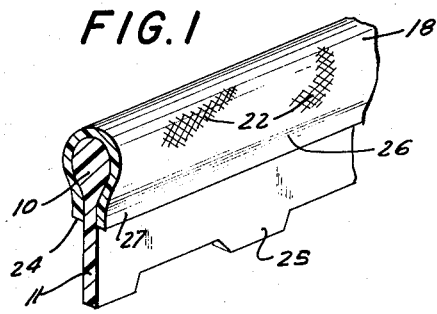
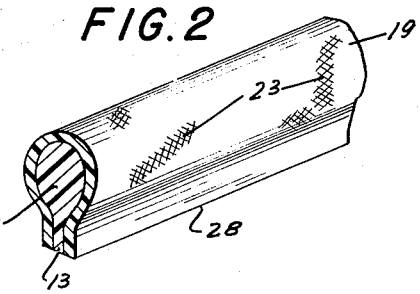
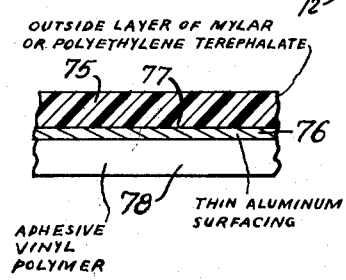
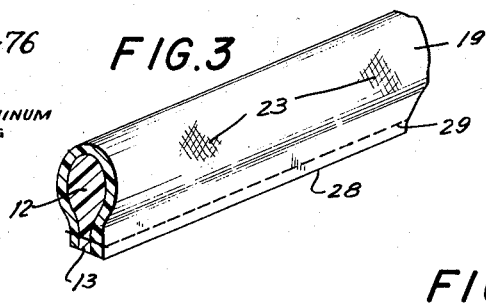
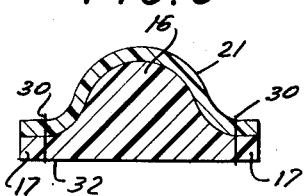
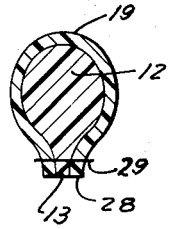
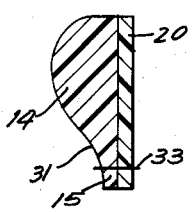
INVENTORS
CHARLES BROOKS,
THOMAS A. SUTTON
ATTORNEY “United States Patent Office” — 3,086,216 — Patented Apr. 23, 1963

3,086,216
REINFORCED PROTECTED DECORATIVE
STRIP MATERIALS
Charles Brooks and Thomas A. Sutton, Brooklyn, N.Y., assignors to The Cee-Bee Manufacturing Company, Inc., Brooklyn, N.Y., a corporation of New York
Filed July 21, 1959, Ser. No. 828,648
3 Claims. (Cl. 2—278)

The present invention relates to a novel protected reinforced extruded plastic strip material and it particularly relates to the protection and reinforcement of extruded vinyl plastic materials.

Although the present invention will have a particular application to the protection of beading which may be used for decorative purposes it has a particular application to the protection of extruded plastic strips or beading which is to be stitched in position and in which the lines of stitching are to be reinforced to prevent ripping or tearing.

It is among the objects of the present invention to provide a novel reinforced extruded plastic strip material and particularly beaded strip material which may be readily stitched without likelihood of such stitches ripping or tearing and without weakening of the plastic strip, and without likelihood of the detachment of the plastic strip along the line of stitching.

Another object is to provide a novel reinforced extruded plastic beading which is provided with a narrow section for attachment to a supporting structure which is to be decorative or receive the beading and which will be so reinforced that the means of attachment will not serve to weaken the beading.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to extrude preferably in beaded form a flowable and almost molten plastic material, desirably of the vinyl chloride type and while in this semi-fluid condition apply thereto or to cover at least one side thereof with a relatively stiff reinforced thin sheet of strong plastic strip material, preferably of the nature of polyethylene terephthalate which takes the form of a reinforced thin metallized film serving as a facing sheet.

In the preferred form of the invention, the thin reinforcing facing film is surfaced on its inside face with a thin metallized metallic film to give it increased strength without affecting its pliability with said film being of the order of 1 to 5/10,000 of an inch and not exceeding 1 to 3/4,000 of an inch. The preferred film may have a preferred thickness of 1/1,000,000 to 1/10,000.

At the same time over this metal film on the inside face of the terephthalate film or reinforced thin facing sheet is positioned by coating a thin layer of a vinyl adhesive.

In the preferred form of the invention, the beading is desirably extruded in the form of a cylindrical or circular cross-section with a reduced width or thickness attachment strip integrally formed therewith.

In the desired form of the invention, while the extruded vinyl material is still hot and plastic the beading is covered by said thin metallized facing film which is pressed therein preferably with a ridging or corrugating device, as to give enhanced adhesive properties and so as to assure a uniform close contact over the entire area thereof. This corrugation will give a firm junction between the thin flexible facing reinforcing material or reinforced thin facing sheet and the semi-fluid or semi-plastic fluid resinous extruded material.

As soon as the adhesive metallized side of the facing film or reinforced thin metallized facing sheet of polyethylene terephthalate known as Mylar has been pressed down into the plastic body while the extruded material is still plastic to assure a substantially permanent combination, the edges of the plastic which should project beyond the facing material are expanded around the edges of the facing material or reinforced thin metallized facing sheet of polyethylene terephthalate known as Mylar to give a combination recessed junction for the facing material.

Then the product is run through cold water until it is reduced to room temperature and it has been found that a substantially permanent junction of the metallized facing or reinforced thin metallized facing sheet of polyethylene terephthalate known as Mylar and the plastic extruded body has been achieved.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIGURE 1 is a side perspective view showing one form of the invention with the extruded beading being in cross-section and showing the beading being covered by the corrugated facing strip.

FIG. 2 is a side perspective view showing the covering strip and the thin edge of the beading terminating at the same point.

FIG. 3 is a side perspective view similar to FIG. 2, showing how stitching is applied to the laminated thin attachment strip in which the extruded plastic is sandwiched between the reinforcing facing film.

FIG. 4 is a transverse sectional view of the strip of FIG. 3 showing where the stitching is applied.

FIG. 5 is a transverse sectional view of an alternative form of cross-section where the reinforcing strip is only applied to one face of the beading and the beading is uncovered on its other face.

FIG. 6 is a transverse sectional view of an alternative form of beading where there are shown two thin attachment strips.

FIG. 7 shows in diagrammatic view the trilaminate which is used as the covering reinforcing strip.

The vinyl plastic extruded material or beading indicated at 10 in FIG. 1 is desirably extruded under pressure from a semi-liquid or semi-fluid molten mass formed from beads of a vinyl chloride or vinyl chloride acetate copolymer caused to fuse under substantial heat above the softening point of the vinyl plastic.

The fuse or plastic mass is then extruded through an opening having the same shape as indicated at 10, 12, 14 or 16 and while it still retains the heat of the fusion, it is united with the trilaminate indicated at 18, 19, 20 and 21.

The shapes indicated at 10 with the attachment strip 11, or as indicated at 12 (FIGS. 2, 3 and 4) with the attachment strip 13, or as indicated in FIG. 5, at 14, with the attachment strip 15, or as indicated in FIG. 6, at 16, with the attachment edges 17, are desirably extruded through a die having the shape of the vinyl plastic, with the cross-sections as shown at 10—11 of FIG. 1; 12—13 of FIGS. 2, 3 and 4; 14—15 of FIG. 5 and 16—17 of FIG. 6 being formed immediately upon extrusion of the material.

It will be noted that in each cross-section, as shown in FIGS. 1–6, there is a major bead portion 10, 12, 14 or 16 which has thin edges 11, 13, 15 and 17 serving as attachment elements which may be utilized for stitching on other attachment connections to the material which is to receive the beading.

While the extruded material is still semi-molten or semi-plastic it is desirably covered and pressed with the covering protective facing film as indicated at 18, 19, 20 and 21, which may be corrugated or ridged, or otherwise have an irregular surface as indicated at 22 in FIG. 1 and 23 in FIG. 2, so as to cause an extended contact face and assure a better adhesion when the material is finally cooled and then flexed. This facing film is generally applied before any cooling operation and it desirably consists of a thin strip of terephthalate material also known as Mylar put out by DuPont or Videne put out by Goodyear.

This facing material may be used in transparent form but is desirably reinforced by being metallized with a thin almost inappreciable layer of vaporized metal such as aluminum and less preferably gold, silver, brass or copper.

Desirably the metallized surface of the facing film which is applied to the plastic beading 10, 12, 14 or 16 has been coated with a vinyl facing to act as an adhesive and aid the corrugation or ridging in maintaining the adhesion.

The reinforced thin sheet of strong plastic strip material is shown in detail in FIG. 7 and it consists of a base or outside layer of Mylar or polyethylene terephthalate 75 having a thin aluminum surfacing 76 applied to the underside 77 of the film 75 with a vinyl undercoat of an adhesive vinyl polymer 78 which can be attached to and integrated with hot extruded base bead 10 or 12 at an elevated temperature of 350 to 400° F.

As shown in FIG. 1, the covering material will terminate at 24 leaving the unprotected edge 25 uncovered. The stitching will then be applied at position 26 through the sandwich formed by the two outside layers 27 of the film and the inside plastic edge 11.

In the form as shown in FIGS. 2, 3 and 4 all edges will terminate together at 28 and the stitching 29 will extend through the outside layers of reinforcing facing film as well as the inside plastic edge 13.

In the embodiment in FIGS. 5 and 6, the stitching as indicated at 33 and 30 will extend through a single layer of the reinforcing facing film 20 and 21 and through the exposed faces 31 and 32 of the extruded plastic body 14 and 16, respectively. The stitching as indicated at 29, 30 and 33 being through the reinforcing facing film 18, 19, 20 and 21 will not rip the thin plastic section and will permanently hold the material in position. By stitching these beadings in the manner indicated, it is possible to obtain a much stronger and firmer construction which will not be readily ripped and in which the beading will form a permanent attachment.

The stitching together with the flexible plastic structure and the reinforcing stiff facing film will withstand considerable stretching or flexing without separation.

The most satisfactory type of lamination has been found to consist of a very thin metal layer preferably of vacuum deposited thickness which is encased between a non-adhesive plastic film and an adhesive plastic film. This structure is shown in FIG. 7 and the metallized film 76 is positioned between the non-adhesive plastic film 75 and the adhesive film 78.

In the preferred process a polyester film, such as Mylar, having a thickness ranging from one-half to two or three mils, is vacuum coated with vapors of copper, aluminum, silver, gold, nickel or cobalt or combinations thereof on one side only, the other side being protected by rollers of stripping or masking. This thickness may be of the order $1/1,000,000$ to $1/10,000$.

It has been found that if this metallized application is less than one-half mil and desirably in the range of one hundredth to one-tenth mil, the metal is of sufficient thickness to give the reinforcement while not of sufficient thickness to disadvantageously effect the pliability or flexibility of the vinyl strip or sheet.

For example, where the plastic base 10, 12, 14 or 16 is polyvinyl chloride, the adhesive surface 78 is also polyvinyl chloride so that the laminating metallized sheet on this contacting surface will have the same plastic material or a similar plastic material to which a base strip is applied. However, the plasticizers should be present in greater proportion in the polyvinyl chloride adhesive film 78 than in the base sheet or strip 10, 12, 14 or 16. Desirably the plasticizers in the adhesive strip should be one and one-half to two times the percentage weight than those in the base strip or extruded vinyl plastic.

Where an alkyl phthalate or other fatty acid ester is used as a plasticizer, the proportion in an adhesive coating should always be greater than the proportion of the base material.

The Mylar film may be metallized in a vacuum by a thin vacuum deposited coating of silver, gold tin, aluminum, copper, cobalt or nickel or combinations of these or other metals. This coating need not be more than one-tenth of a mil, and may be as thin as one-hundredth of a mil.

The extruded hot polyvinyl chloride material containing about forty to sixty percent of plasticizer, such as dioctyl phthalate, or diisooctyl phthalate, one to two percent of barium, cadmium, tin and/or lead stearate and two to five percent of a stabilizer such as tin, barium, cadmium or zinc mercaptide is extruded at a temperature of about three hundred to four hundred fifty degrees Fahrenheit.

The present invention may be widely used in connection with the application of extruded plastic beading to boys', women's and men's beltings, trimmings for men's, boys' and ladies' hats, ladies' handbags, welting and various trims for shoes; furniture, furniture covers, seat covers, automotive trim both interior as well as exterior of the automotive body; moldings and weltings for edging, sealing or trimming.

The preferred polyester film material referred to by its trademark Mylar is made from polyethylene terephthalate which is a polymer formed by a condensation reaction between ethylene glycol and terephthalic acids.

Although the present invention has a particular application to flexible polymerized polyvinyl chloride it also has a broad application to rigid plastic, such as rigid vinyl polymers, polyethylene and also to a lesser degree to extruded cellulose acetate and butyrate.

While we have herein described a preferred form of our invention, it should be understood that the same may be altered in details and in relative arrangement of parts within the scope of the appended claims.

The thickness of the Mylar film may range from $1/1,000,000$ to $1/10,000$ of an inch and the base material may be vinyl chloride polymer or vinylidene chloride polymer. The stitching may be attached to the edges of Mylar covering and through the extruded polymer incidental to the joining operation in which the welt is sewn into a seam in an upholstery pad or covering or piece of luggage and the Mylar film will extend down far enough to engage the stitch where it is sewn through the polymer as well as the piece of leather, fabric, or plastic forming part of the cover, upholstery or luggage. Normally the stitching will extend through both the polyester film and the thin section of the vinyl extrusion with the entire unit being sewn into a seam in an upholstery pad or piece of luggage.

Having now particularly described and ascertained the nature of the invention, and in what manner the same is to be performed, what is claimed is:

1. A method of making a stitched reinforced bead and fin structure comprising extruding a bead-like element of vinyl chloride having a large cylindrical body and an integral thin fin and then simultaneously superimposing upon said extruded vinyl chloride element, while said element retains the heat of extrusion, an outer sheet having an inside layer of a vinyl chloride adhesive, causing said outer sheet to cover at least a portion of said body and said fin, applying pressure to said outer sheet to cause said vinyl chloride adhesive layer to become integrated with said hot extruded vinyl chloride element, quickly chilling the integral material, and then stitching through the covered portion of said fin.

2. A reinforced plastic beading comprising an enlarged vinyl chloride polymer bead section, a thin integral attachment section extending outwardly from said bead section as a continuous part thereof, and a reinforcing covering extending over at least a portion of said bead section and said attachment section, said covering consisting of a trilaminate of an outer polyethylene terephthalate layer, an intermediate metallized layer and an inner vinyl chloride adhesive layer applied to said beading section and joining said covering to said bead and attachment sections.

3. A beading in accordance with claim 2, wherein said metallized layer has a thickness between about $1/1,000,000$ and about $1/10,000$ of an inch.

References Cited in the file of this patent

UNITED STATES PATENTS

| | | |
|---|---|---|
| 1,613,044 | Marshall | Jan. 4, 1927 |
| 1,958,131 | Davidson | May 8, 1934 |
| 2,347,158 | Spraragen | Apr. 18, 1944 |
| 2,426,769 | Gould | Sept. 2, 1947 |
| 2,686,747 | Wurtz et al. | Aug. 17, 1954 |
| 2,705,211 | Wyk | Mar. 29, 1955 |
| 2,774,120 | Beare | Dec. 18, 1956 |
| 2,809,393 | Hauptman | Oct. 15, 1957 |
| 2,932,121 | Weitzel | Apr. 12, 1960 |